United States Patent

Yamamoto et al.

Patent Number: 5,548,048
Date of Patent: Aug. 20, 1996

[54] PROCESS FOR MANUFACTURING ALKYL-SUBSTITUTED POLY (2,2'-DIYL) BIPYRIDINE-5,5'-DIYL

[75] Inventors: Takakazu Yamamoto, Yokohama; Tsukasa Maruyama, Machida, both of Japan

[73] Assignee: Tokyo Institute of Technology, Tokyo, Japan

[21] Appl. No.: 412,883

[22] Filed: Mar. 29, 1995

Related U.S. Application Data

[62] Division of Ser. No. 128,038, Sep. 29, 1993, Pat. No. 5,424,381.

[30] Foreign Application Priority Data

Mar. 29, 1993  [JP]  Japan .................................. 5-70405

[51] Int. Cl.⁶ ............................ C08F 126/06; C08F 4/80
[52] U.S. Cl. ........................................... 526/265; 526/171
[58] Field of Search .................................... 526/265, 240

[56] References Cited

PUBLICATIONS

Yamamoto et al., Chemistry Letters, pp. 223–224, 1990. "Preparation and Properties of Poly(2,2'–bipyridine–5, 5'–diyl)".
Yamamoto, et al., "Preparation and Properties of Poly(2, 2'–bipyridine–5,5'–diyl)", *Chemistry Letters*, The Chemical Society of Japan, (1990), pp. 223–224.

*Primary Examiner*—Joseph L. Schofer
*Assistant Examiner*—Wu C. Cheng
*Attorney, Agent, or Firm*—Spencer & Frank

[57] ABSTRACT

A process for manufacturing a polymer composed of an alkyl substituted poly(2,2'-bipyridine-5,5'-diyl) having a chemical formula which is at least one of:

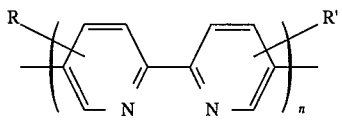

and

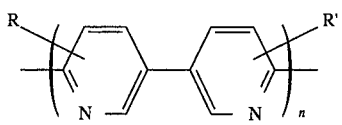

wherein R and R' are H or an alkyl group having not less than 1 carbon atom, except that at least one of R and R' is an alkyl group having not less than 3 carbons, 'n' is a degree of polymerization and is not less than 10, the process including:

providing at least one alkyl substituted 5,5'-dihalogenated-2,2'-bipyridine having alkyl substituents in the 3-, 4- or 6-position of two pyridinediyl groups; and polymerizing the at least one alkyl substituted 5,5'-dihalogeanted-2,2'-bipyridine by adding an effective amount thereto of at least one substance which is effective to remove halogens therefrom, which at least one substance is selected from the group consisting of (a) at least one metal which is capable of dehalogenating the alkyl substituted 5,5'-dihalogenated-2,2'-bipyridine and (b) at least one compound containing at least one metal which is capable of dehalogenating alkyl substituted 5,5'-dihalogenated-2,2'-bipyridine.

6 Claims, 2 Drawing Sheets

PROCESS FOR MANUFACTURING ALKYL-SUBSTITUTED POLY (2,2'-DIYL) BIPYRIDINE-5,5'-DIYL

This is a division of application Ser. No. 08/128,038 filed Sep. 29, 1993, now U.S. Pat. No. 5,424,381.

BACKGROUND OF THE INVENTION

1. Technical Field

This invention relates to a novel alkyl-substituted poly(2,2'-bipyridine-5,5'-diyl), a manufacturing process for the same and its applications. The polymer contains bivalent residues selected from alkyl-substituted 5,5'-dihalogenated-2,2'-bipyridine and 6,6'-dihalogenated-3,3'-bipyridine wherein halogen atoms are removed to make the repeating unit. The polymer, which presents a π-conjugated system along with its principal chain, is conductive after chemical and electrochemical doping process, stable in the air, soluble into various organic solvents, and a ligand to metal elements.

BACKGROUND ART

Recently, macromolecular compounds having a π-conjugated system are appreciated as materials utilizing the electrolytic and optical function. In these macromolecular compounds having the π-conjugated system, π electrons in the system are directed in one dimension along with the principal chain of the macromolecular compounds. Therefore, electrolytic anisotropy and optical anisotropy are shown between one direction along the principal chain and the other direction perpendicular to said one direction.

It is necessary to orientate the principal chain of the macromolecule in a predetermined direction for utilizing the elctrolytic anisotropy and optical anisotropy effectively. However, these macromolecules are stiff, insoluble and hard to melt, because the π electrons are directed in one dimension along the principal chain. Therefore, it is difficult to give a predetermined shape to the macromolecule and to orientate the principal chain in a predetermined direction.

As these conductive materials having the π-conjugated system along the principal chain, various compounds such as shown below are known.

(1) Polyacethylene
$\text{\textendash}(CH=CH)_n\text{\textendash}$ (2) Poly-p-phenylene

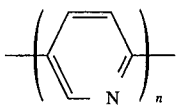

(3) Polythiophene (4) Polypyrrole (5) Polypyridine (6) Polyalkylpyridine

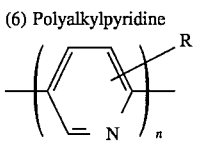

However, because most of the known conductive macromolecules having the π-conjugated system have a rigid structure and are insoluble to organic solvents etc. and hard to melt, an effective method for processing them has not been found. It is rather difficult to mold and give a predetermined shape to the known macromolecules. Therefore, only limited applications have been found for the macromolecules and the unique functions of them have not been utilized effectively.

To solve the above problems, the attempt has been carried out to introduce a substitution group into the aromatic ring of polythiphene, poly-p-phenylene, polypyrrole or the like for improving the solubility of these compounds to the organic solvents.

Moreover, the above known macromolecules become only p-types conductor by oxidation.

Therefore, it is desired to develop materials having properties not shown in the prior conductive macromolecules by modifying the chemical structures of them. For example, it is desired to develop a π-conjugated conductive macromolecules indicating n-type conductivity instead of p-type conductivity which has already been obtained by the prior conductive macromolecules. Such conductive macromolecules indicating n-type conductivity can be used for semiconductor devices.

Also, when a metal element is coordinated with a macromolecular ligand having π-conjugation conductivity and rigid structure, there is obtained a macromolecular metal complex being n an electric state such that the ligand has a semiconductor-like band structure, that have conventionally been considered impossible; or in a coordinating site such that the coordination is easily turned to an unsaturated state because of the rigidity of the ligand that have also been considered impossible.

It is easy to obtain a n-type conductor by reducing poly(2,2'-bipyridine-5,5'-diyl) (PBpy) having, for example, the chemical formula 7 as follows:

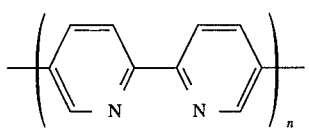

PBpy

Poly(2,2'-bipyridine-5,5'-diyl) has coordinating ability to the metal element owing to the chelate coordination structure as a repeating structural unit like 2,2'-bipyridine. However, PBpy is soluble only in limited solvents, such as formic acid or concentrated sulfuric acid, and therefore its application is very limited. Moreover, the molecular weight of the PBpy is not large enough for preparing strong films made of PBpy and therefore application of a PBpy film is very limited.

Although polyalkylpyridine represented by the above formula 6 has a sufficiently high molecular weight and high solubility in usual organic solvents, such as chloroform, etc., and is likely to be reduced to a n-type conductor, it still has such a problem that it is considerably low in coordinating ability with a metal ion on the whole because polyalkylpyridine has an alkylpyridine structure as a repeating unit, that mainly consists of a head-to-tail unit.

DISCLOSURE OF INVENTION

Considering these background arts, the inventors of the present invention have searched for a novel conductive macromolecule having a novel molecular structure to solve the above problems.

It is an object of the present invention to provide a novel macromolecule which has a molecular weight large enough for preparing a strong shaped body, such as a film, an excellent heat-resistivity and solubility in various organic solvents.

It is another object of the invention to provide a novel macromolecule wherein it is possible to control its depolarization effect and an electrochemical oxidation-reduction potential.

It is another object of the invention to provide a novel macromolecule which is an effective π-conjugated polymer ligand to the metal element.

It is another object of the invention to provide a novel macromolecule which may be utilized as a predetermined shape, such as a fiber, a film or the like.

It is another object of the invention to provide a novel macromolecule which may be utilized as conductive materials of n-type conductor or the like, materials for batteries, materials for electrochromic devices, materials for electronic devices, such as transistors or diodes.

It is another object of the invention to provide a novel macromolecule which may be utilized as a effective π-conjugated polymer ligand to the metal element or the like.

The inventors directed their attention to poly(2,2'-bipyridine-5,5'-diyl) which has a repeating unit corresponding to one of typical chelate ligands, 2,2'-bipyridine, and as a result of an intense research, they have found that when a long alkyl group, such as a hexyl group, pentyl group, octyl group, decyl group, dodecyl group, etc., is introduced into a polybipyridine, there is obtained an alkyl group-substituted poly(2,2'-bipyridine-5,5'-diyl) which has sufficiently high molecular weight, heat resistance, and solubility to many usual organic solvents, and is easy to be produced into a film by way of an organic solution thereof. The thus-obtained alkyl group-substituted poly(2,2'-bipyridine-5,5'-diyl) is reduced to a n-type conductor and has high coordinating ability to a metal element. The present invention was completed based upon this finding.

The present invention provides poly(2,2'-bipyridine-5,5'-diyl) having the chemical formulae (8) and (9) as follows:

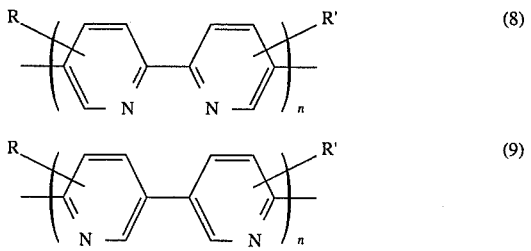

In the chemical formulue (8) and (9), 'R and R'' are H or an alkyl group having not less than 1 carbon atom, however, at least one of R and R' is an alkyl group having not less than 3 carbons, 'n' is a degree of polymerization and not less than 10. When the degree of polymerization (n) is less than 10, the alkyl substituted poly(2,2'-bipyridine-5,5'-diyl) may lack a substantial function as a polymer. The inventors prepared the alkyl substituted poly(2,2'-bipyridine-5,5'-diyl) of the invention as described below, and confirmed the excellent properties and the applicability of the polymer in experiments described below. As a matter of course, the preparation and the application of the polymer are not limited by the examples.

Moreover, at least one of 'R and R'' is an alkyl group having not less than 3 carbon atoms, for example, hexyl group, pentyl group, octyl group, dectyl group, dodecyl group etc. Both 'R and R'' may be an alkyl group having not less than 3 carbon atoms. When one of 'R and R'' may be an alkyl group having not less than 3 carbon atoms, the other may be H or an alkyl group having 1 or 2 carbon atoms. When the number of the carbon atoms in the alkyl group both 'R and R'' are less than 3, the polymer is insoluble to usual organic solvents.

The alkyl substituted poly(2,2'-bipyridine-5,5'-diyl) of the invention contains the above alkyl group (R and/or R'), having a relatively long chain, in the repeating unit of the polymer and therefore has a molecular weight large enough for preparing a strong shaped body such as a film.

Dihalogenated compound may be obtained by the following method

2-amino-methylpyridine (manufactured by Tokyo Kasei corporation) having the above formula (10) is reacted with butyllithium and triemethylsilyl chloride in tetrahydrofuran to give the compound having the following formula (11).

This compound is then reacted with lithium diisopropylamide and alkyl halide (the alkyl group in the alkyl halide contains carbon atoms not less than 2) in tetrahydrofuran to replace hydrogen of the methyl group in the compound of the formula (11) by the alkyl group (R') in the alkyl halide (R'X).

In the above formula (12), 'R'' is an alkyl group having not less than 2 carbon atoms; the $N(TMS)_2$ group in the above formula (11) is converted to the $NH_2$ group in the above formula (12) during the work using HCl.

2-amino-alkylpyridine compound as shown in the above formula (12) is then subjected to a first halogenatin step using a halogen or a halogen compound in ethanol, sodium hydroxide to obtain 2-amino-5-halogenated-alkylpyridine as shown in the following formula (13).

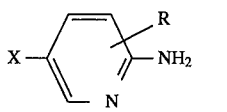
(13)

In the above formula (13), 'R' is an alkyl group having not less than 3 carbon atoms and 'X' is a halogen atom.

2-amino-5-halogenated-alkylpyridine is then subjected to a second halogenation step using a halogen or a halogen compound in hydrogen halide, sodium nitrite, sodium hydroxide to obtain 2,5-dihalogenated alkylpyridine as shown in the formula (14).

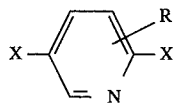
(14)

Then, the halogenated-alkylpyridine having the above formula (14) is reacted with sodium slat of methanethiol salt in benzene under reflux to give 5-halogeno-2-methylsulfenyl-alkyl pyridine having the following formula (15).

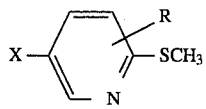
(15)

This compound is then reacted with halogen peroxide in acetic acid to give 5-halogeno-2-methyl sulfinyl-alkyl pyridine having the following formula (16).

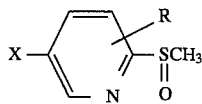
(16)

Then, 5-halogeno-2-methylsulfinyl-akylpyridine is reacted with ethylmagnesium bromide in tetrahydrofuran to give dihalogenated aromatic compound having the following formula (17) used in the invention, and this compound is reacted with zero-valent nickel complex to give the polymer of the invention.

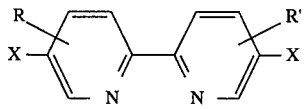
(17)

Moreover, the polymer of the invention may be manufactured by subjecting 5,5'-dihalogenated-2,2'-bipyridine having an alkyl substituents in the 3-, 4- or 6-position of two pyrinediyl groups or 6,6'-dihalogenated-3,3'-bipyridine having an alkyl substituents in the 2-, 4- or 5-position of two pyridinediyl groups to a electrolytic reduction reaction in the presence of a compound containing a transition metal, such as nickel or palladium.

Moreover, the polymer of the invention may be manufactured by subjecting 5,5'-dihalogenated-2,2'-bipyridine having alkyl substituents in the 3-, 4- or 6-position of two pyrinediyl groups or 6,6'-dihalogenated-3,3'-bipyridine having alkyl substituents in the 2-, 4- or 5-position of two pyridinediyl groups to a de-halogenation polycondensation reaction by using magnesium (Mg) or zinc (Zn) in the presence of a compound containing a transition metal, such as nickel or palladium.

The novel alkyl substituted poly(2,2'-bipyridine-5,5'-diyl) of the invention contains the alkyl group having 3 or more carbon atoms introduced in its pyridine ring. Because of the special effect of the alkyl group having a relatively long carbon-carbon chain, the polymer of the invention has a molecular weight large enough for preparing a strong shaped body such as a film or a fiber, an excellent heat-resistivity, high stability in the air and solubility in various organic solvents. Therefore, the polymer may be utilized in many application fields wherein the prior art conductive macromolecules are not utilized. It is possible to dissolve the polymer of the invention into the suitable organic solvents for preparing a solution and to obtain a fiber, a film etc., by drying and shaping the solution. Moreover, the polymer of the invention indicates clear color-change by a chemical or electrochemical reduction and becomes a n-type conductor. Moreover, the polymer may be utilized as a polymer ligand to the metal element. Such surprising properties are not shown in the prior art conductive macromolecules.

Then, the polymer of the present invention, which is a π-conjugated conductive macromolecule, can be synthesized easily and at a low cost.

In other words, the novel alkyl substituted poly(2,2'-bipyridine-5,5'-diyl) of the invention, characterized by the excellent properties, can be shaped as a strong fiber or film after dissolving the polymer into the organic solvent. Moreover, the polymer can be reduced by using a reducing agent or by a chemical or electrochemical doping. Therefore, the polymer of the invention may be utilized as materials for batteries, materials for electrochromic devices, materials for electronic devices, such as transistors or diodes, conductive materials of n-type conductor, and polymer a ligand to the metal element or the like.

DETAILED DESCRIPTION OF THE INVENTION

Figure 1:
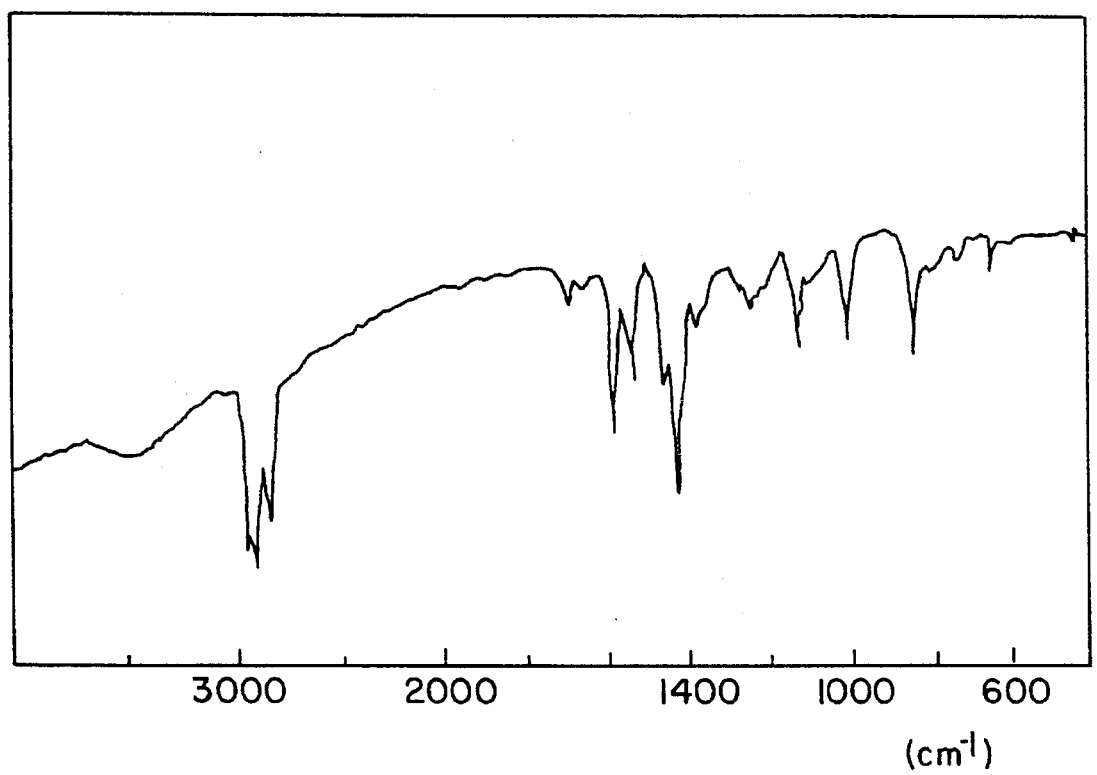
FIG. 1 is a chart showing an infrared absorption spectrum of an example of the polymer according to the invention.

The alkyl substituted poly(2,2'-bipyridine-5,5'-diyl) according to the present invention can be obtained by reacting an alkyl substituted 5,5'-dihalogenated 2,2'-bipyridine, with an equimolar amount or excess of a zero-valent nickel compound added thereto in an organic solvent, followed by dehalogenation. A preferable reaction temperature ranges between room temperature and boiling point of the solvent. The reaction completes within about 1–48 hours. As the above organic solvent, toluene, tetrahydrofuran or the like can be employed.

The zero-valent nickel compound withdraws halogens from halogenated aromatic compounds and causes a coupling reaction between the aromatic groups [for example, see "Synthesis", p.736 (1984)]. This reaction is represented by the following equation (18):

$$Ar-X + Ar'-X + NiL_m \rightarrow Ar-Ar' + NiX_2L_m \qquad (18)$$

wherein Ar and Ar' represent an aromatic group, X represents a halogen atom, L represents a neutral ligand and hence $NiL_m$ represents a zero-valent nickel compound.

Accordingly, if an aromatic compound having two halogens in the molecule, such as alkyl substituted 5,5'-dihalogenated-2,2'-bipyridine, is reacted with an equimolar or excess of a zero-valent nickel compound, the polymer of the present invention can be obtained by the dehalogenation polycondensation reaction shown in the following equations (19) and (20):

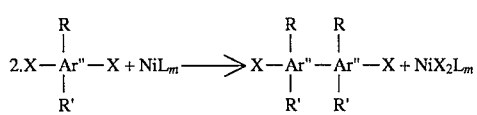

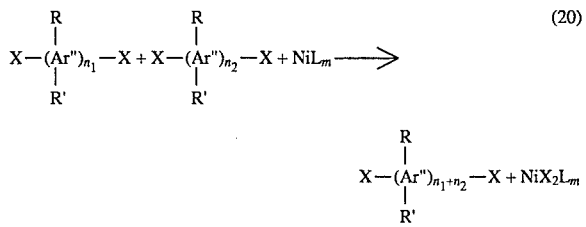

wherein

represents an alkyl substituted 5,5'-dihalogenated-2,2'-bipyridine, R and R' are H or an alkyl group having not less than 1 carbon atom, however, at least one of R and R' represents a long chain alkyl group having not less than 3 carbon atoms and, where X is a halogen.

In the above-described reaction, as the zero-valent nickel compound, those synthesized in a reaction system, so to speak, in situ, immediately before conducting a polymerization reaction can be used directly. Alternatively, preliminarily synthesized and isolated ones also can be used. Such a zero-valent nickel compound is, for example, a nickel complex produced by a reduction reaction or a ligand interchange reaction in the presence of a neutral ligand. As a typical example of the neutral ligand, mention may be made of 1,5-cyclooctadiene, 2,2'-bipyridine, triphenylphosphine or the like.

Alternatively, the alkyl substituted poly(2,2'-bipyridine-5,5'-diyl) can be obtained by another process wherein the alkyl substituted 5,5'-dihalogenated-2,2'-bipyridine shown in the above chemical formula (17) undergoes a dehalogenation reaction when it is subjected to an electrochemical reduction reaction in the presence of a divalent nickel compound. Namely, when a divalent nickel compound is electrochemically reduced in an electrolytic cell, a zero-valent nickel compound is produced by the reaction shown in the following chemical formula (22).

$$[Ni^{II}L_m]^{2+} + 2e \rightarrow Ni^0 L_m \quad (22)$$

Accordingly, when an aromatic compound having two halogens in the molecule, namely, an alkyl substituted 5,5'-dihalogeanted-2,2'-bipyridine is electrochemically reduced in the presence of a divalent nickel compound, the polymer of this invention can be obtained according to the reaction shown in the chemical formula (22) and the reactions shown in the following formulae (23)–(25) consequently taking place, wherein the $Ni^0 L_m$ producing in the reaction system is involved.

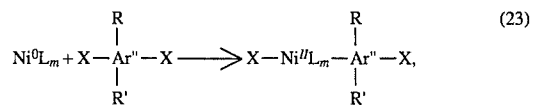

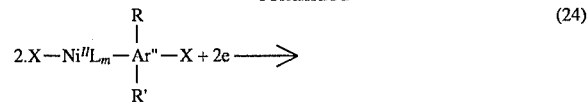

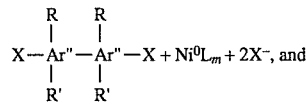

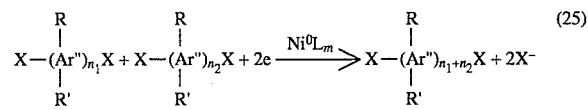

wherein $$\begin{array}{c} R \\ | \\ X-Ar''-X \\ | \\ R' \end{array} \quad (26)$$

represents an alkyl substituted 5,5'-dihalogenated-2,2'-bipyridine, R and R' are H or an alkyl group having not less than 1 carbon atom, however, at least one of R and R' represents a long chain alkyl group having not less than 3 carbon atoms and, where X is a halogen.

The electrolysis may be conducted generally in the following conditions: namely, polar solvents, such as N,N-dimethylformamide and acetonitrile are, used as the solvent salts, such as tetraethylammonium perchlorate and tetraethylammonium tetrafluoroborate as, the supporting electrolytic salt are dissolved to prepare an electrolyte and electrodes, such as a platinum electrode, ITO transparent electrode and graphite electrode are employed as the electrode. The alkyl substituted 5,5'-dihalogenated-2,2'-bipyridine and divalent nickel complex are dissolved in the electrolyte and the elector-chemical reduction is conducted at a reduction potential of the divalent nickel complex, for example, at $-1.7$ V vs Ag/AG$^+$ in the case of tris(2,2-bipyridine)nickel(III) salt.

Moreover, in another method, alkyl substituted poly(2,2'-bipyridine-5,5'-diyl) having the chemical formula (8) may be manufactured by subjecting alkyl substituted 5,5'-dihalogeanted-2,2'-bipyridine to a dehalogenation polycondensation reaction by using magnesium or zinc in the presence of a divalent nickel compound. In other words, zero-valent nickel compound may be prepared by a reducing reaction with magnesium or zinc and the polymerization reaction is eventually expressed as shown in the formula (27).

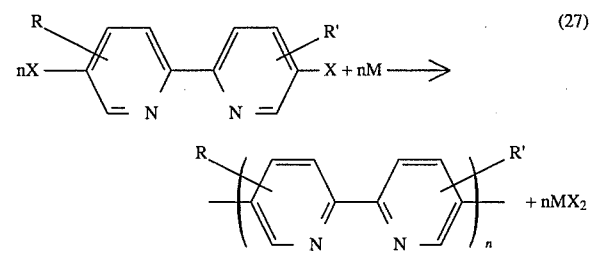

Therefore, the polymer having the chemical formula 8 can be obtained by reducing an alkyl substituted 5,5'-dihalogenated-2,2'-bipyridine, with an equimolar amount or excess of a Mg or Zn in the presence of a divalent nickel compound, as shown in the formula (22) and followed by the formulae (19)–(21).

The above nickel compounds which have been synthesized and isolated prior to the polymerization reaction can be used. Alternatively, those synthesized from nickel or a nickel compound in an electrolytic cell can be used directly as they are in the cell. As such a nickel compound, mention may be made of, for example, tris(2,2'-bipyridine)nickel(II) dibromide [Ni(bpy)$_3$]Br$_2$, dibromobis(triphenylphosphine)nickel (II) [Ni(PPh$_3$)$_2$]Br$_2$ or the like.

There is no limit to these polymerization reaction conditions, however, from a point of raising a yield and molecular weight, it is preferable that polymerization is carried out in substantial no water and no oxygen conditions.

The present invention will be explained more concretely and detailedly by way of example hereinafter.

next, it will be explained the metal coordinating function of the polymer of the present invention. In general, pyridine and 2,2'-bipyridine are chelate ligands that can be coordinated with a metal element via a pair of unpaired electrons of nitrogen in the ring. Coordinating ability and stability of coordinated product of 2,2'-bipyridine are greater than those of pyridine.

Polyalkylpyridine includes a head-to-tail unit and head-to-head (tail-to-tail) unit, and mainly consisted of head-to-tail unit. This means that the polyalkylpyridine is a ligand of the pyridine-type and therefore, the coordinating ability with a metal ion is generally low.

On the other hand, alkyl substituted poly(2,2'-bipyridine-5,5'-diyl) consists only of head-to-head (tail-to-tail) unit and is classified into a bipyridine-type ligand. Accordingly, this polymer has a coordinating ability with a medallion, etc. and can perform a function as a polymer ligand to a metal element.

The polymer of the present invention coordinated with a metal element is especially useful as a conductive polymer catalyst.

EXAMPLE 1

0.99 g of a bis(1,5-cyclooctadiene) nickel complex (Ni(cod)$_2$) (3.6 mmol) was dissolved in 30 ml of N,N-dimethylformamide (hereinafter referred to as "DMF"), and 0.56 g of 2,2'-bipyridine (bpy) (3.6 mmol) and 0.39 g of 1,5-cyclooctadiene (cod) (3.6 mmol) were added thereto. To this solution was dropped 1.45 g of 6,6'-dihexyl-5,5'-dibromo-2,2'-bipyridine (3.0 mol) dissolved in 20 ml of a DMF solution, thereafter reacted at a reaction temperature of 60° C. for 49 hours, and polymerized. As a polymerization proceeds, there was produced an ocher-colored precipitate of an alkyl substituted poly(2,2'-bipyridine-5,5'-diyl) polymer. After completion of the reaction, the precipitate was filtered and recovered, and washed with the use of the following materials (a) to (e) several times, and the polymer was refined. (a) ammonia water (29%), (b) methyl alcohol, (c) a warm aqueous solution of sodium ethylenediaminetetraacetic acid (prepared to pH=3), (d) warm water and (e) methyl alcohol.

After washed, the precipitate was vacuum-dried to obtain 0.40 g of ocher-colored powder of alkyl substituted poly(2, 2'-bipyridine-5,5'-diyl). A yield of the polymer was 80%.

The infrared absorption spectrum of this polymer is shown in FIG. 1. There is observed absorption derived from C—H stretching vibration of a pyridine ring at 3030 cm$^{-1}$, C—H stretching vibration by a side chain hexyl group at 2850–2950 cm$^{-1}$, skeletal vibration of a pyridine ring and deformation vibration of a side chain methylene group at 1580, 1530, 1460 and 1420 cm$^{-1}$, and C—H out-of-plane deformation vibration of a pyridine ring at 830 cm$^{-1}$.

Figure 2:
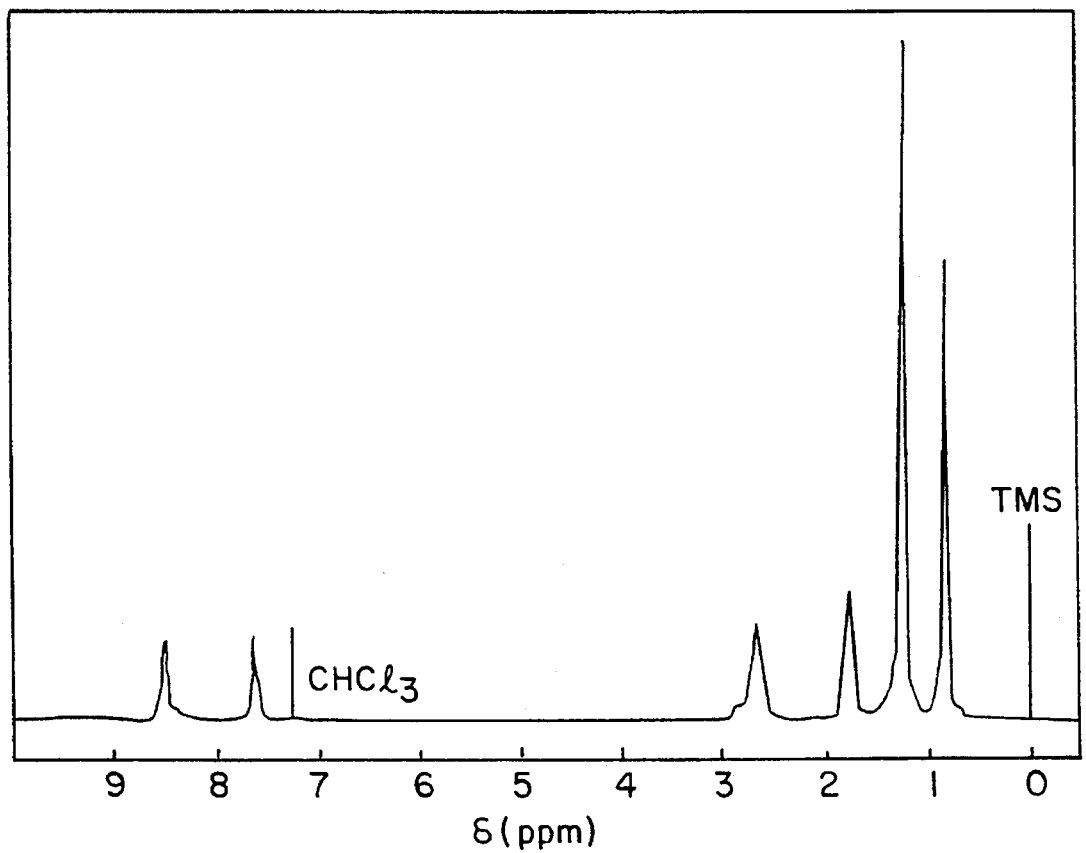
FIG. 2 is a chart showing a proton NMR spectrum of an example of the polymer according to the invention.

Moreover, FIG. 2 shows $^1$H-NMR in CDCl$_3$ of the polymer. There is observed absorption derived from a side chain hexyl group at $\delta$=0.8–3.0 ppm (inside standard: tetramethylsilane) and hydrogen of a pyridine ring at $\delta$=7.6–8.5 ppm. An area ratio of respective peaks was about 13:2. Moreover, element analysis values of the obtained polymer were 81.0% of carbon, 8.8% of hydrogen, 8.7% of nitrogen and 0.0% of bromine.

The result of the infrared absorption spectrum $^1$H-NMR and element analysis supports that the polymer has the following structure.

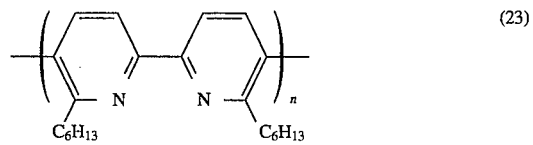

where, n shows a degree of polymerization.

Poly(2,2'-bipyridine-5,5'-diyl) was only soluble in formic acid as an organic solvent, while the above polymer has a long-chain alkyl group as a side chain, so that it was soluble in not only formic acid but also general organic solvents shown below. That is, the polymer was soluble in chloroform (solubility of about 300 mg/ml), tetrahydrofuran (THF) (solubility of about 300 mg/ml), benzene (solubility of about 300 mg/ml), toluene (solubility of about 300 mg/ml), cresol and N-methylpyrrolidone (NMP), and partly soluble in diethyl ether. A cast film was tried to prepare from a formic acid solution of poly(2,2'-bipyridine-5,5'-diyl), but a strong film could not be obtained, while a cast film was prepared from said solution of the present polymer, and a strong and ocher-colored free standing film was obtained.

When a molecular weight of this polymer was measured in a formic acid solution by a light scattering method, a weight-average molecular weight was 37000 (degree of polymerization 110) which was higher than the weight-average molecular weight 3200 (degree of polymerization 21) of poly(2,2'-bipyridine-5,5'-diyl). Moreover, in case of measuring the molecular weight, even when a chloroform solution was used as solvent instead of formic acid, the weight-average molecular weight observed in chloroform was substantially the same as that observed in formic acid.

The ultraviolet visible absorption spectrum of said polymer showed a sharp π-π* transition absorption peak at about 350 nm in a formic acid solution and at about 320 nm in either one of a chloroform, THF, benzene, toluene or NMP solution. Moreover, said polymer showed a high thermal stability.

As a result of thermogravimetric analysis under nitrogen, weight reduction was observed from the proximity of 300° C. and was about 45% at 900° C.

EXAMPLE 2

A chloroform solution of the poly(6,6'-dihexyl-2,2'-bipyridine-5,5'-diyl) obtained in Example 1 was applied onto a platinum plate, and chloroform was removed to prepare a film of the polymer. With respect to this polymer film, cyclic voltammogram was measured in an acetonitrile solution containing 0.1 mol/l of [(C$_2$H$_5$)$_4$N][ClO$_4$]. As a result, it was found in the polymer that a cation is doped (n-type doping) for Ag/Ag$^+$ at about −2.5 V, and developed at about −2.4 V (potential for Ag/AG$^+$) in sweeping in the reverse direction. In case of doping, the color of the polymer film was changed from ocher to deep red orange, and in case of dedoping, discoloration went by contraries.

Thus, the present polymer is possible to be electrochemically reduced, that is, electrochemical n-type doping, and together with doping, electrochromic property was shown. It is shown from the above that the present polymer represents n-type conductive character and is usable as battery electrode material and electrochromic element material.

EXAMPLE 3

A formic acid solution and a chloroform solution of poly(6,6'-dihexyl-2,2'-bipydine-5,5'-diyl) obtained in the example 1 were prepared. The polymer was contained in each solution in a concentration of $2.0 \times 10^{-5}$ mol/l of its unit structure. Fluorescence spectra were measured about the solutions at an excitation wavelength of 310 nm. As a result, luminescence was observed at 420 nm in the formic acid solution and at 360 nm in the chloroform solution.

As described above, the polymer is capable of radiating fluorescence. Therefore, the polymer may be utilized as a material for an electroluminescence device.

EXAMPLE 4

15 mg of alkyl substituted poly(2,2'-bipyridine-5,5'-diyl) obtained in Example 1 was added to 5 ml of toluene solution of 10 mg of $Ni(cod)_2$, and the resulting solution was subjected to a reaction at 30° C. to obtain a nickel complex. Before the addition of alkyl substituted poly(2,2'-bipyridine-5,5'-diyl), the color of the toluene solution was yellow and after the addition, color of the solution changed from yellow to dark green as time passed. Also, the color change of the solution was examined by a UV-visible spectrophotometer and the absorption peak was observed around 600–650 nm due to the formation of nickel complex. Further, it was found that the absorption peak at 600–650 nm gradually increased with the reaction time. With respect to the reactions with other transition-metal compounds, it is observed the color change characteristic of complex formation when a complex was formed. Accordingly, it is understood that the polymer of the present invention is easily coordinated with a metal element and functions as a polymer ligand.

EXAMPLE 5

An alkyl substituted poly(2,2'-bipyridine-5,5'-diyl) (30 mg) obtained in Example 1 was reacted with the material having the ability of quaternize the pyridine ring (for example, $(CH_3O)_2SO_2$, $CH_3I$ and the like) to obtain the quaternized material. The obtained polymer was complete soluble to the polar solvent such as methanol, ethanol and the like.

EXAMPLE 6

2.4 g of 6,6'-dihexyl-5,5'-dibromo-2,2'-bipyridine (5.0 mmol) was dissolved into 15 ml of tetrahydrofuran (THF), 0.13 g of a piece of metal magnesium (5.5 mmol) was added into the resulting solution. After the solution was heated and refluxed for 10 hours, dichlor [1,2-bis (diphenylphosphino) ethane] nickel(II) $NiCl_2$ (dpe) 5 mg, 0.01 mmol) was added into the heated solution, which was then heated and refluxed for 13 hours. After the reaction was completed, the reaction solution was poured into diluted hydrochloric acid containing ices, the resulting mixture was neutralized by adding water containing $Na_2CO_3$. The polymer was recovered by filtration and was washed with water and ether, and further washed with warm water solution containing ethylenediaminetetraacetic acid disodium salt. The resulting polymer was then vacuum dried and 0.50 g of alkyl substituted poly(2,2'-bipyridine-5,5'-diyl) was obtained. The yield of the polymer was 60%.

EXAMPLE 7

2.4 g of 6,6'-dihexyl-5,5'-dibromo-2,2'-bipyridine (5.0 mmol) was dissolved into 5 ml of hexamethylphosphoric triamide (HMPA), a powder of zinc (0.98 g, 15 mmol) was added into the resulting solution which was then heated to 100° C. Then, 60 mg of dibromo [1,2-bis (diphenylphosphino) ethane] nickel(II) $NiBr_2$ (dpe) 0.1 mmol) was added into the heated solution and reacted at 140° C. for 17 hours. After the reaction was completed, the reaction solution was poured into diluted hydrochloric acid containing ices, the resulting mixture was alkalified by adding ammonia water and the polymer was recovered by filtration.

The above polymer was washed with methyl alcohol, water solution containing ethylenediamine tetraacetic acid disodium salt and then vacuum dried. 0.40 g of alkyl substituted poly(2,2'-bipydine-5,5'-diyl) was obtained.

EXAMPLE 8

0.3 mmol of 6,6'-dihexyl-5,5'-dibromo-2,2'-bipyridine, 0.15 mmol of tris (2,2'-bipyridine) nickel(II) bromide ($[Ni(bpy)_3]Br_2$) and 3.75 mmol of tetraethylammonium perchrolate ($[(C_2H_5)_4N][ClO_4]$) were dissolved into N,N-dimethylformamide to prepare an electrolytic solution. This solution was filled into an electrolytic bath in which a platinum plate (1.33 2 cm=2 $cm^2$) was arranged as a cathode, a platinum plate (1.33 2 cm=2 $cm^2$) was arranged as a anode and a silver electrode was arranged as a reference electrode. Then, an electrolytic polymerization was carried out at a polymerization temperature of 60° C., at an electrolytic potential of $-1.7$ V (the potential was for $Ag/AG^+$ which is same in the following description) and for 16 hours to provide a film consisting of a ocher-colored polymer on the anode. This crude polymer was collected and purified using the following substances (a) to (e) by washing the polymer with the substances (a) to (e) in the following order, the crude polymer was washed several times by each substance.

(a) water containing ammonia (29%), (b) methyl alcohol, (c) warm water solution containing ethylene-diaminetetraacetic acid disodium salt (its pH was 3), (d), warm water, (e) methyl alcohol.

After the above washing step, the polymer was vacuum dried and ocher-colored alkyl substituted poly(2,2'-bipyridine-5,5-diyl) was obtained.

What is claimed is:

1. A process for manufacturing a polymer comprised of an alkyl substituted poly(2,2'-bipyridine-5,5'-diyl) having a chemical formula which is at least one of:

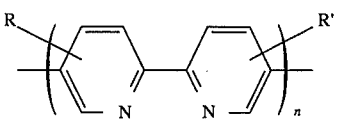

and

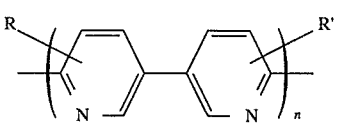

where R and R' are H or an alkyl group having not less than 1 carbon atom, except that at least one of R and R' is an alkyl group having not less than 3 carbons, 'n' is a degree of polymerization and is not less than 10, the process comprising:

a. providing at least one alkyl substituted 5,5'-dihalogenated-2,2'-bipyridine having alkyl substituents in the 3-, 4- or 6-position of two pyridinediyl groups; and b. polymerizing the at least one alkyl substituted 5,5'-dihalogeanted-2,2'-bipyridine by adding an effective amount thereto of at least one substance which is effective to remove halogens therefrom, which at least one substance is selected from the group consisting of (a) at least one metal which is capable of dehalogenating the alkyl substituted 5,5'-dihalogenated-2,2'-bipyridine and (b) at least one compound containing at least one metal which is capable of dehalogenating alkyl substituted 5,5'-dihalogenated-2,2'-bipyridine.

2. The process as claimed in claim 1, wherein the at least one compound containing at least one metal is at least one zero-valent nickel compound.

3. A process for manufacturing a polymer comprised of an alkyl substituted poly(2,2'-bipyridine-5,5'-diyl) having a chemical formula which is at least one of:

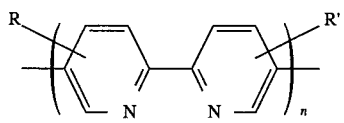

and

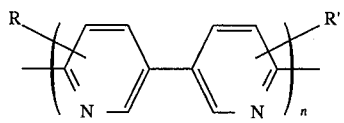

where R and R' are H or an alkyl group having not less than 1 carbon atom, except that at least one of R and R' is an alkyl group having not less than 3 carbons, 'n' is a degree of polymerization and is not less than 10, the process comprising:

a. providing at least one alkyl substituted 5,5'-dihalogenated-2,2'-bipyridine having alkyl substituents in the 3-, 4- or 6-position of two pyridinediyl groups; and b. polymerizing the at least one alkyl substituted 5,5'-dihalogenated-2,2'-bipyridine by subjecting the at least one alkyl substituted 5,5'-dihalogeanted-2,2'-bipyridine to an electrochemical reduction in the presence of at least one compound containing at least one metal which is capable of dehalogenating the at least one alkyl substituted 5,5'-dihalogeanted-2,2'-bipyridine and which is at least one transition metal whereby halogens are removed from the at least one alkyl substituted 5,5'-dihalogenated-2,2'-bipyridine.

4. A process for manufacturing a polymer comprised of an alkyl substituted poly(2,2'-bipyridine-5,5'-diyl) having a chemical formula which is at least one of:

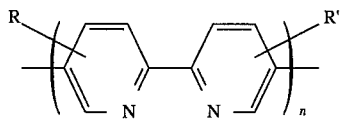

and

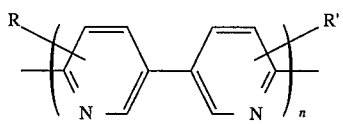

where R and R' are H or an alkyl group having not less than 1 carbon atom, except that at least one of R and R' is an alkyl group having not less than 3 carbons, 'n' is a degree of polymerization and is not less than 10, the process comprising:

a. providing at least one alkyl substituted 5,5'-dihalogenated-2,2'-bipyridine having alkyl substituents in the 3-, 4- or 6-position of two pyridinediyl groups; and b. polymerizing the at least one alkyl substituted 5,5'-dihalogenated-2,2'-bipyridine by subjecting the at least one alkyl substituted 5,5'-dihalogeanted-2,2'-bipyridine to a dehalogenation polycondensation reaction by adding an effective amount of, in combination, at least one metal selected from the group consisting of magnesium (Mg) and zinc (Zn), and at least one compound containing at least one metal which is a transition metal, which at least one metal and at least one compound are capable, in combination, of dehalogenating the alkyl substituted 5,5'-dihalogeanted-2,2'-bipyridine.

5. The process as claimed in claim 3, wherein the at least one compound is a divalent nickel compound and the process further comprises conducting the electrochemical reduction at the reduction potential of the divalent nickel compound.

6. The process as claimed in claim 4, wherein the at least one compound is a divalent nickel compound and the process further comprises employing the at least one metal to reduce the divalent nickel compound to provide a zero-valent nickel compound.

* * * * *